(12) United States Patent
Lejin P J

(10) Patent No.: US 12,401,708 B2
(45) Date of Patent: Aug. 26, 2025

(54) SYSTEMS AND METHODS TO PROTECT AGAINST INFORMATION DISCLOSURE

(71) Applicant: Salesforce, Inc., San Francisco, CA (US)

(72) Inventor: Jose Lejin P J, Bangalore (IN)

(73) Assignee: Salesforce, Inc.

( * ) Notice: Subject to any disclaimer, the term of this patent is extended or adjusted under 35 U.S.C. 154(b) by 268 days.

(21) Appl. No.: 18/067,875

(22) Filed: Dec. 19, 2022

(65) Prior Publication Data

US 2024/0205287 A1   Jun. 20, 2024

(51) Int. Cl.
*H04L 67/02* (2022.01)
*G06F 16/955* (2019.01)
*H04L 9/40* (2022.01)
*H04L 65/401* (2022.01)

(52) U.S. Cl.
CPC .......... *H04L 67/02* (2013.01); *G06F 16/9566* (2019.01); *H04L 63/20* (2013.01); *H04L 65/401* (2022.05)

(58) Field of Classification Search
CPC ....... H04L 67/02; H04L 65/401; H04L 63/20; G06F 16/9566
USPC .............................. 726/3; 709/217, 218, 219
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

*Primary Examiner* — Liang Che A Wang
(74) *Attorney, Agent, or Firm* — Lorenz & Kopf, LLP

(57) ABSTRACT

A method for protecting against sensitive data disclosure includes receiving a user request to launch a web application in a web browser; loading code for the web application in the web browser; requesting session initialization from a web server; and receiving a dynamically and randomly generated URL map specific to a session from the web server, wherein the URL map identifies a plurality of randomly generated URL positions and for each URL position a randomly generated number of characters to skip. The method further includes modifying sensitive information associated with a URL in accordance with the URL map; transmitting the URL with the modified sensitive information to the web server; and receiving a requested data object from the web server, wherein the web server decoded the URL with the modified sensitive information to recover the sensitive information and used the decoded URL to access the data object.

20 Claims, 4 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 * | 1/2002 | Lee .................... G06F 9/54 |
| | | 719/329 |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,149,797 B1 * | 12/2006 | Weller ................ G06Q 40/04 |
| | | 370/254 |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0063538 A1 * | 3/2009 | Chitrapura .......... G06F 16/9566 |
| | | 707/999.102 |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0072918 A1 * | 3/2012 | Zhong ................. H04L 67/02 |
| | | 718/104 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0121484 A1 * | 4/2015 | Liu ..................... H04L 63/08 |
| | | 726/5 |
| 2020/0175484 A1 * | 6/2020 | Kumar ............... G06F 16/9566 |

* cited by examiner

SYSTEMS AND METHODS TO PROTECT AGAINST INFORMATION DISCLOSURE

TECHNICAL FIELD

Embodiments of the subject matter described herein relate to server client architectures, and more particularly to systems and methods for obscuring sensitive information in transmissions between a client and server.

BACKGROUND

A number of Network Management Devices/Cloud Solutions are configured and monitored via Web Applications user interfaces. Many Web Applications work via the REST model. REST GET calls may be used in Network Management Interfaces to configure/view sensitive contents for the end user. It is possible that, with GET calls, URLs may be logged in multiple places, such as web browser history, gateway, CDN, perimeter load balancer, etc. Although logging may have benefits, it may be dangerous if these logs are leaked, specifically if the URLs are related to sensitive operations, for example due to containing query parameters or other sensitive information.

The information disclosed in this section is only for enhancement of understanding of the background of the present disclosure and therefore it may contain information that does not form the prior art that is already known in this country to a person of ordinary skill in the art.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a computing system is disclosed. The computing system includes a server-side component that includes non-transitory computer readable media encoded with programming instructions configurable to cause a processor in a server-side computing system to: generate a dynamically and randomly generated map specific to a session, wherein the map identifies a plurality of randomly generated URL positions and for each URL position a randomly generated number of characters to skip; transmit the dynamically and randomly generated map to a client-side computing system for use with a specific session; and responsive to a GET call request received from the client-side computing system for the specific session, decode a URL associated with the GET call request using the dynamically and randomly generated map. The computing system further includes a client-side component including non-transitory computer readable media encoded with programming instructions configurable to cause a processor in the client-side computing system to: modify a URL associated with the GET call request in accordance with the randomly generated map received from the server-side computing system for the specific session; and transmit the GET call request with the modified URL to the server-side computing system.

In another embodiment, a method of executing a GET call request is disclosed. The method includes: generating, in a server-side component, a dynamically and randomly generated URL map specific to a session, the map identifying a plurality of randomly generated URL positions and for each URL position a randomly generated number of characters to skip; transmitting, by the server-side component over a network, the URL map to a client-side component for use with a specific session; modifying, by the client-side component, original URL information associated with a GET call request in accordance with the URL map received from the server-side component for the session; transmitting, by the client-side component over the network, the GET call request with the modified URL information to the server-side component; decoding, by the server-side component, the modified URL associated with the GET call request using the URL map responsive to receiving the GET call request from the client-side component for the session; and recovering, by the server-side component, the original URL information based on the decoding.

In another embodiment, a non-transitory computer readable medium encoded with programming instructions configurable to cause a processor in a client-side computing system to perform a method is disclosed. The method includes: receiving a user request to launch a web application in a web browser; loading code for the web application in the web browser; requesting session initialization from a web server; receiving a dynamically and randomly generated URL map specific to a session from the web server, wherein the URL map identifies a plurality of randomly generated URL positions and for each URL position a randomly generated number of characters to skip; modifying sensitive information associated with a URL at which a data object may be retrieved in accordance with the URL map received from the web server; transmitting the URL with the modified sensitive information to the web server; receiving the requested data object from the web server, wherein the web server decoded the URL with the modified sensitive information to recover the sensitive information and used the decoded URL to access the data object; and causing the data object to be displayed to a user via the web browser.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

In various embodiments, apparatus, systems, techniques, and articles described herein that may protect REST GET call URLs without using complex encryption techniques. Apparatus, systems, techniques, and articles described herein can avoid the complexities of encryption techniques.

Figure 1:
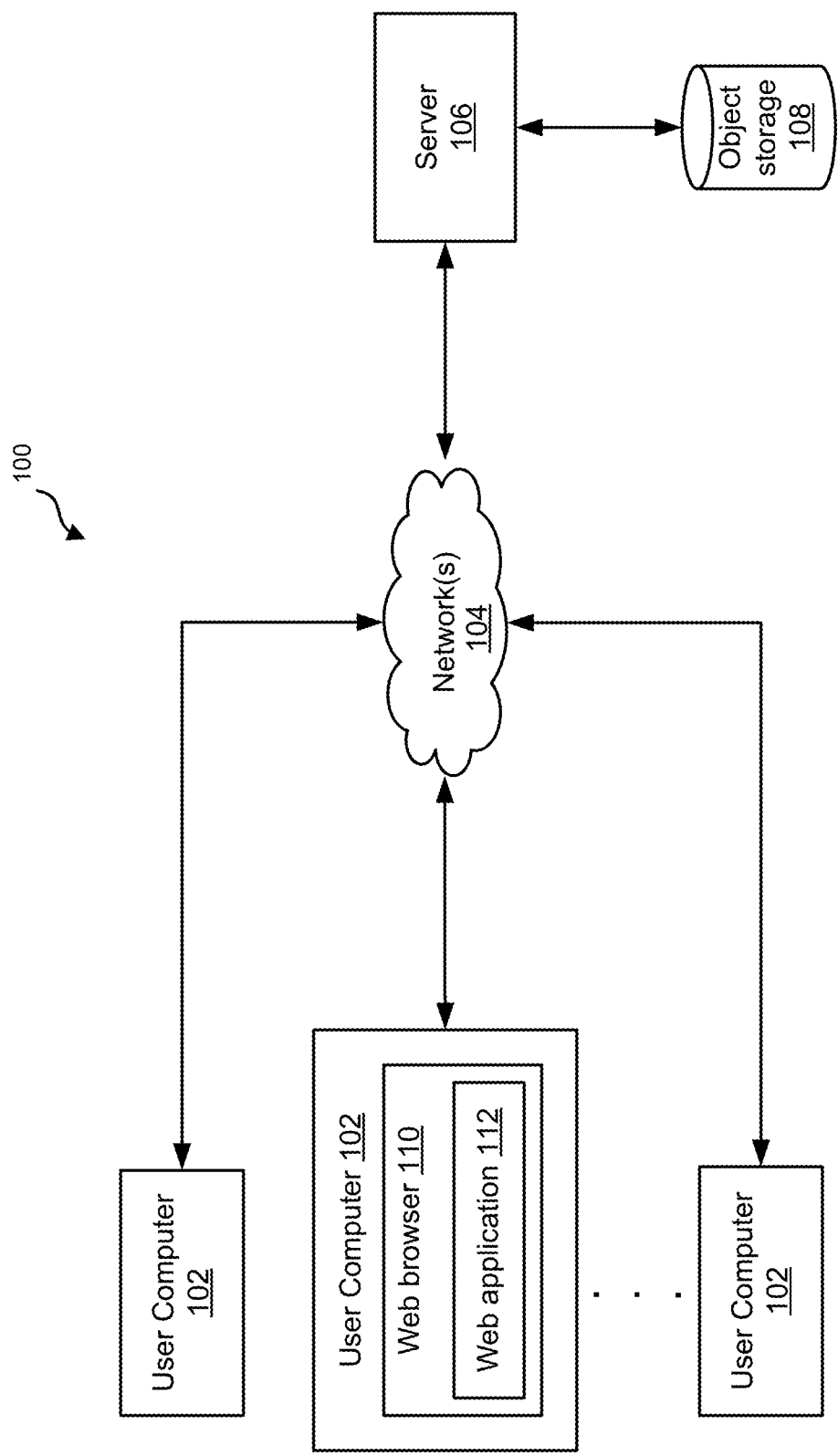
FIG. 1 is a block diagram of an example computing environment that can be used to implement aspects of the current subject matter, in accordance with some embodiments.

FIG. 1 is a block diagram of an example computing environment 100 that can be used to implement aspects of the current subject matter. The example computing environment 100 includes one or more clients, e.g., user computers 102, that access data objects via a network 104 (e.g., the Internet) and a server 106. The example server 106 is associated with a data object storage system 108 such as a database system or server memory for storing data objects and providing data objects on request to a client (e.g., user computers 102).

The example user computers 102 each include at least one processor and computer readable storage media and provides, via the processor and computer readable storage media, a web browser 110 for use by a user of the user computer 102. The web browser 110 may be any of a number of commercially available web browsers (e.g., Firefox, Internet Explorer, Chrome, Safari, and others) or a custom web browser. Through the use of the web browser 110, a user may access a web application 112 that is configured for retrieving data objects via the server 106.

The example user computers 102 may communicate, via the web browser 110 and web application 112, using a representational state transfer (REST) protocol. Representational state transfer (REST) is a software architectural style that describes a uniform interface between physically separate components, often across the Internet in a client-server architecture. REST allows data content to be transferred between client and server when it is requested. RESTful dynamic content based web application uses server-side or client-side rendering to generate a web site and send the content to the requesting web browser, which interprets the server's web application code and renders the page in the user's web browser. With REST, HTTP requests are used to access data or resources in the web application via URL-encoded parameters. Responses are generally formatted as either JSON or XML to transmit the data.

The client (user computer 102) sends requests for data objects to the server 106 and the server sends responses. In this example, a REST GET method is used to request data objects. The REST GET method requests a representation of a resource (i.e., data object) identified by a URL (universal resource locator). Most of the time, GET URLs will have query params and other sensitive information. To protect the sensitive information from prying eyes as it is logged in multiple places like web browser history, gateway(s), a CDN (content delivery network), a perimeter load balancer etc., while being transmitted to the server, the example computing environment 100 implements a solution with client-side components and server-side components. The client-side components and server-side components cooperated to make the URLs contained in the REST GET requests unintelligible outside of the web application 112 and the server 106.

Figure 2:
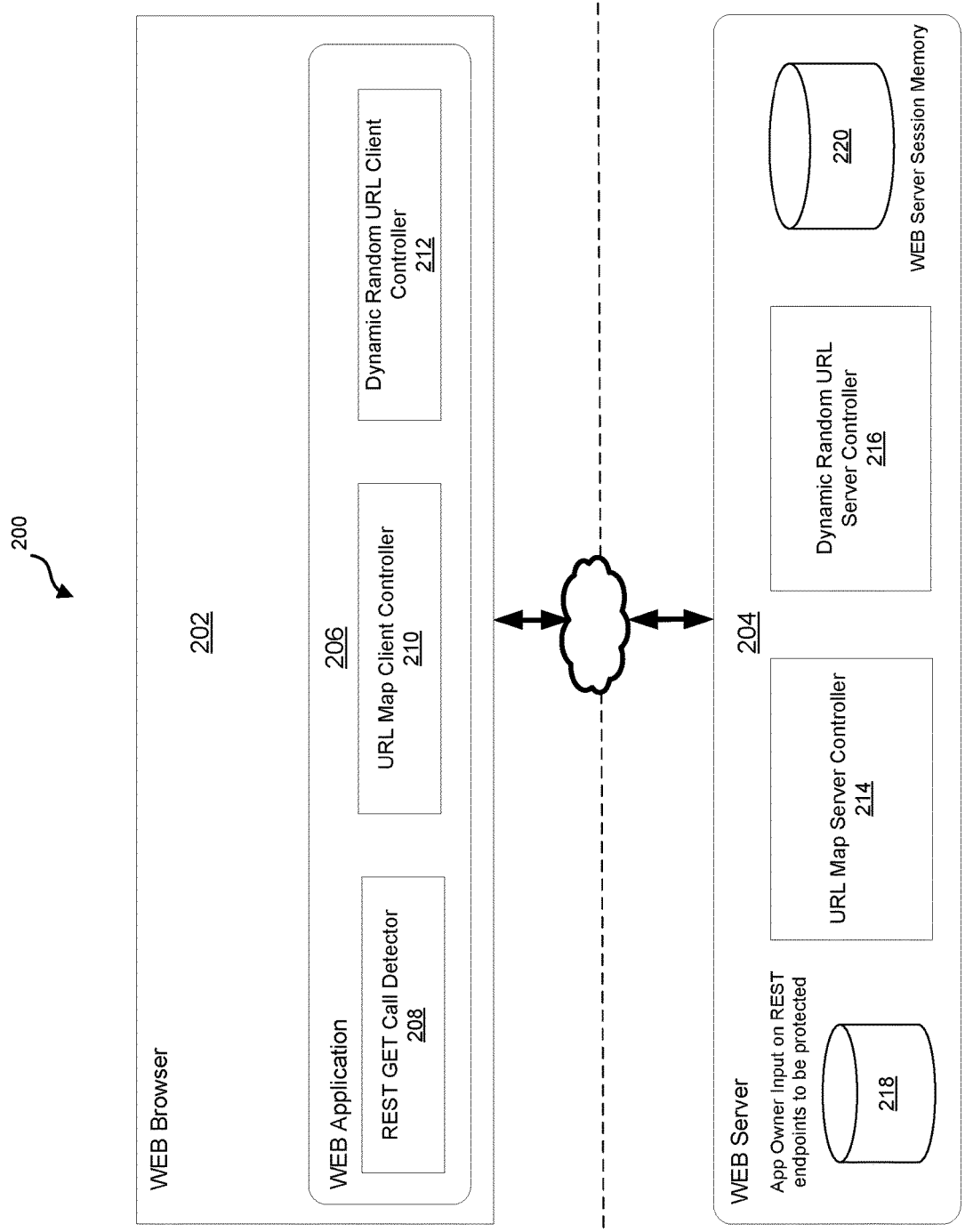
FIG. 2 is a block diagram depicting an example computing environment that includes a logging information protection system for providing protection against URL logging information disclosure of GET calls in a REST model of Network Management Interfaces, in accordance with some embodiments.

FIG. 2 is a block diagram depicting an example computing environment 200 that includes a logging information protection system for providing protection against URL logging information disclosure of GET calls in a REST model of Network Management Interfaces. The example computing environment 200 includes a web browser 202 on a client-side of the computing environment 200 and a server 204 on the server-side of the computing environment 200. The example web browser 202 and the example server 204 each includes a component for implementing a logging information protection system.

The example logging information protection system is executed by a computing system that includes a client-side computing system and a server-side computing system. The client-side computing system includes at least one processor and non-transitory computer readable storage media. The server-side computing system also includes at least one processor and non-transitory computer readable storage media. The example logging information protection system includes a client-side component and a server-side component.

The server-side component includes non-transitory computer readable media encoded with programming instructions configurable to cause a processor in the server-side computing system to: generate a dynamically and randomly generated URL map that is specific to a session, wherein the URL map identifies a plurality of randomly generated URL positions and for each URL position a randomly generated number of characters to skip; transmit the dynamically and randomly generated URL map to the client-side computing system for use with a specific session; and responsive to a GET call request received from the client-side computing system for the specific session, decode a URL associated with the GET call request using the dynamically and randomly generated URL map.

The client-side component of the logging information protection system includes non-transitory computer readable media encoded with programming instructions configurable to cause a processor in the client-side computing system to: modify a URL associated with a GET call request in accordance with the randomly generated map received from the server-side computing system for the specific session; and transmit the GET call request with the modified URL to the server-side computing system.

The example client-side component includes a REST GET call detector 208, a URL map client controller 210, and a dynamic random URL client controller 212. The REST GET call detector 208 is configured to monitor in the web application all calls for a GET call, detect a GET call in the web application, and inform the URL map client controller 210 of the detected GET call. The URL map client controller 210 is configured to store a URL map generated by the server in a local variable in a session context and prepare for URL building in accordance with the URL map, which entails generating for each of a plurality of URL positions specified in the URL map a quantity of randomly generated characters equal to a number of characters to skip specified in the URL map for the URL position. The URL map client controller 210 is further configured to inform the dynamic random URL client controller of the generated quantity of randomly generated characters. The dynamic random URL client controller 212 is configured to build a dynamic and random URL by adding at each URL position specified in the URL map the quantity of randomly generated characters generated for the URL position and transmit the GET call with the modified URL to the server-side computing system.

The example server-side component of the logging information protection system includes non-transitory computer readable media encoded with programming instructions configurable to cause a processor in the server-side computing system to implement a URL map server controller 214 and a dynamic random URL server controller 216. The URL map server controller 214 is configured to build a random URL map for a specific session and transmit the URL map to the client-side computing system. The dynamic random URL server controller 216 is configured to, responsive to being informed of a GET call URL with dynamic random characters added, get map information from the URL map server controller 214, restore a URL, which includes extracting a URL after the endpoint of a main domain name, removing the number of characters specified in the URL map to be skipped at the first URL position specified in the URL map, and repeatedly removing the number of characters specified in the URL map to be skipped at the next URL position specified in the URL map until no more URL positions are left.

In an example implementation, the owner of the web application 206, before use of the logging information protection system provides information about the REST endpoints which need protection from logging information disclosure. This can be provided as a list of REST endpoint URLs and stored in local server memory or data storage 218. Also, the owner of the web application 206 provides the maximum possible length of a REST GET call URL in the web application. The logging information protection system can use this information to generate a URL map.

When a session is established for the web application 206, the server-side component (e.g., 214, 216) of the logging information protection system generates a URL map and saves the URL map in web server session memory 220. An example format for a URL map is listed below:

```
[
    {
        url_position: <number>
        characters_to_be_skipped: <number>
    },
    {
        url_position: <number>,
        characters_to_be_skipped: <number>
    },
    {
        url_position: <number>,
        characters_to_be_skipped: <number>
    },
    ...
    ...
    ...
]
```

The URL map is a dynamically (e.g., at time of session initialization) and randomly (e.g., randomly, pseudo-randomly, or varying) generated URL map that is specific to a particular session. The numbers in the url_position: <number> and the characters_to_be_skipped: <number> in the URL map are randomly generated by the server-side component of the logging information protection system.

A number of different mechanisms may be applied to pass the URL map from the server-side component of the logging information protection system to the client-side component (e.g., 214, 216) of the logging information protection system. In one example, the URL map may be passed from the server-side to the client-side as part of a login call response. The URL map can be stored on the client-side in a simple JavaScript variable in the context of the web application current session in the web browser.

When the web application 206 generates a REST GET call, the client-side component of the logging information protection system adds random characters to the URL information in the REST GET call, based on the URL map. The random characters can make the original URL unintelligible to someone without the URL map thus making the URL information safer to transmit over a public network. The number of random characters added is equal to the characters_to_be_skipped specified in the URL map generated for the specific session and the locations at which the random characters are added are in accordance with the url_position specified in the URL map.

In one example illustration of a logging information protection system using a URL map to protect URL information from dissemination during transit from a client to a server, after a session is established, a server may generate the following dynamically and randomly generated URL map, save the URL map in web server session memory 220, and send the URL map to a client:

```
[
    {
        url_position: 10,
        characters_to_be_skipped: 5
    },
    {
        url_position: 34,
        characters_to_be_skipped: 2
    },
]
```

In this example, the following REST GET call is generated by the web application in the web browser:
https://www.linkedin.com/voyager/api/identity/dash/profiles?decorationId=com.linkedin.voyager.dash.deco.identity.profile.WebTopCardCore-6&memberIdentity=tomj&q=memberIdentity The client-side component of the logging information protection system may perform the following steps. Step 1: Identify url_positions 10 and 34 as indicated in the map:
https:www.linkedin.com/voyager/api/identity/dash/profiles?decorationId=com.linkedin.voyag er.dash.deco.identity.profile.WebTopCardCore-6&memberIdentity=tomj&q=memberIdentity Step 2: Now add the number of random characters at these positions that are indicated in the map. In this example, characters_to_be_skipped are equal to 5 for the first url_position and 2 for the second url_position, so 5 random characters are added at the first url_position and 2 random characters are added at the second url_position:
https://wxqy35.ww.linkedin.com/voyager/45api/identity/dash/profiles?decorationId=com.linkedin.voyager.dash.deco.identity.profile.WebTopCardCore-6&memberIdentity=tomj&q=memberIdentity Step 3: After this the domain name prefix is prepended to this URL. In this example, the URL will be:
https://www.linkedin.com/https://wxqy35.ww.linkedin.com/voyager/45api/identity/dash/profiles?decorationId=com.linkedin.voyager.dash.deco.identity.profile.WebTopCardCore-6&memberIdentity=tomj&q=memberIdentity The URL listed above will be transmitted to the server-side with the REST GET call. In this example, the actual domain URL is prepended. This is done, in this example, so that the REST GET call is made to the intended server endpoint only. Also, in real cases, many numbers of "url_position" will be in the map. Using many numbers of "url_position" can make the URL appear as junk, and even if the URL is recorded it will not be intelligible. In various embodiments, a number of "url_positions" sufficient to cover at least $\frac{1}{4}^{th}$ of the length of the URL positions is used.

This example proceeds to server-side operations. The server-side component of the logging information protection system receives the REST GET call with the modified URL. The server-side component of the logging information protection system may perform the following steps to recover the original URL.

Step 1: First the server-side component of the logging information protection system will extract the URL after the main domain endpoint (e.g., the case prefix https://www.linkedin.com/will be removed first).

Step 2: Because the server-side component of the logging information protection system generated the URL map, it already knows the URL map. Therefore, based on the URL map, the server-side component of the logging information protection system will start reversing the encoding of the URL information to recover the original URL information. First as per map, xqy35 is removed:

```
[
    {
        url_position: 10,
        characters_to_be_skipped: 5
    },
```

This leaves the URL, in this example, as:
https://www.linkedin.com/voyager/45api/identity/dash/profiles?decorationId=com.linkedin.voyager.dash.deco.identity.profile.WebTopCardCore-6&memberIdentity=tomj&q=memberIdentity Step 3: the server-side component of the logging information protection system will continue reversing the encoding of the URL information to recover the original URL information:

```
    {
        url_position: 34,
        characters_to_be skipped: 2
    },
```

45 is removed. This restores the URL, in this example, as:
https://www.linkedin.com/voyager.api/identity/dash/profiles?decorationID=com.linkedin.voyager.dash.deco.identity.profile.WebTopCardCore-6&memberIdentity=tomj&q=memberIdentity Now that the original REST GET call URL has been recovered on the server side, server-side process may proceed as per application logic. The foregoing example has been simplified to illustrate the principle. In real world cases, many URL positions can be identified in the map and many random characters added to junk up the URL information. An implementer can decide the number of URL positions to include, and the length of the random characters added based on the level of protection needed. In various embodiments, at least ¼th of the length of the URL positions may include random characters.

Even if the URL is logged in between transmission between the client and the server, such as in a web browser history, gateway logging, perimeter side logging etc., the URL information will not be useful. The URL can appear as junk and no information will be disclosed, even if the logs are compromised later.

Figure 3:
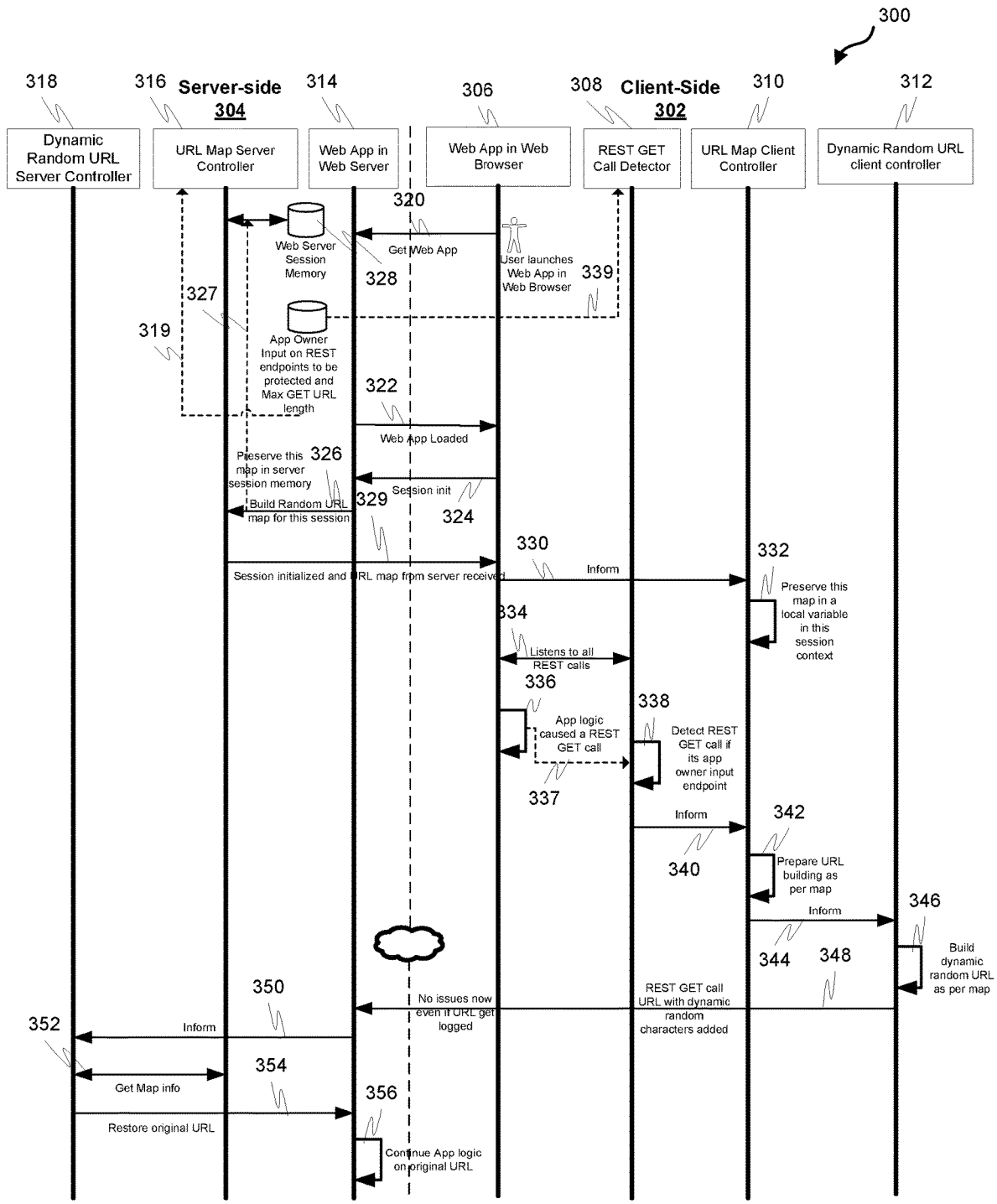
FIG. 3 is an example sequence diagram in an example client/server system having a client-side component and a server-side component, in accordance with some embodiments.

FIG. 3 is an example sequence diagram 300 in an example client/server system having a client-side component 302 and a server-side component 304. The example sequence diagram 300 depicts an example operating sequence in which a client (e.g., user computer 102) sends REST GET requests to a server (e.g., server 106) in a manner that makes a URL contained in the REST GET request unintelligible outside of a web application on the client-side and the server on the server-side. The example client-side component 302 includes a web app in a web browser 306, a REST GET call detector 308, a URL map client controller 310, and a dynamic random URL client controller 312. The example server-side component includes a web app 314 in web server, a URL map server controller 316, and a dynamic random URL server controller 318.

At operation 319, input on REST endpoints to be protected and maximum GET URL length is received from the owner of the web application.

At operation 320, responsive to a user launching a web app in a web browser 306, the web browser 306 sends a request to the web server to get the web app.

At operation 322, the web app is loaded in the web browser 306.

At operation 324, a request for a session to be initialized is sent from the web app in the web browser 306 to the web app 314 in the web server.

At operation 326, responsive to a session initialization request, the web app 314 in the web server instructs the URL map server controller 316 to build a URL map, wherein the URL map server controller 316 builds a URL map, which is a dynamically and randomly generated map specific to the session.

At operation 327, the URL map is saved in web server session memory 328.

At operation 329, the session is initialized, and the URL map is passed to the web app in the web browser 306. The URL map can also be passed as part of the login call response.

At operation 330, the web app in the web browser 306 informs the URL Map client controller 310 of the URL map.

At operation 332, the URL Map client controller stores the URL map in a local variable in the session content.

At operation 334, the REST Get call detector 308 listens to all REST calls from the web app in the web browser 306.

At operation 336, the web app in the web browser 306 causes a REST GET call.

At operation 337, the REST Get call detector 308 listens to the REST GET call.

At operation 338, the REST Get call detector 308 detects the REST GET call if the app owner had inputted an endpoint.

At operation 339, the REST Get call detector 308 is informed if the app owner had inputted an endpoint via any of the responses from the server, such as a login response or some other type of response.

At operation 340, the REST Get call detector 308 informs the URL Map client controller 310 of the REST GET call.

At operation 342, responsive to being informed of the REST GET call, the URL Map client controller 310 determines the modifications needed for the URL in the REST GET call in accordance with the URL Map.

At operation 344, the URL Map client controller 310 informs the dynamic random URL client controller 312 of the modifications needed for the URL in the REST GET call.

At operation 346, the dynamic random URL client controller 312 builds the URL in the REST GET call in accordance with the modifications and the URL Map.

At operation 348, the dynamic random URL client controller 312 sends the REST GET Call URL with dynamic random characters added to the web app 314 in the web server.

At operation 350, the web app 314 in the web server informs the dynamic random URL server controller 318 of the REST GET Call URL with dynamic random characters added.

At operation 352, the dynamic random URL server controller 318 gets the URL map information for the session.

At operation 354, the dynamic random URL server controller 318 restores the original URL based on the URL map information and passes the original URL to the web app 314 in web server.

At operation 356, the web app 314 in the web server continues app logic with the original URL.

The foregoing example illustrates providing protection against URL logging information disclosure of GET calls in a REST model of Network Management Interfaces. In this example, the client-side component makes URL parameters appear as junk so that even if the parameters are logged, no information is leaked. The server-side component creates a dynamically and randomly generated URL map per session. The server-side component also recovers URL information that has been altered in accordance with the URL map after receipt from the client-side component. Because a prefix that is an actual domain is prepended to the URL information, modified URL information can be appropriately handled. A default route can be added on the server side for handling the modified URL information. This can allow the modified URL to be deciphered by the server-side component and the original URL information recovered.

The server can maintain the standard session using existing server infrastructure. The randomly generated URL map that is specific to a session can be maintained in the corresponding session memory. The server side component can create a new session if a user logs in from a new system. All of the different sessions can be well separated using standard web server session infrastructure (e.g., Apache+ PHP server side).

Figure 4:
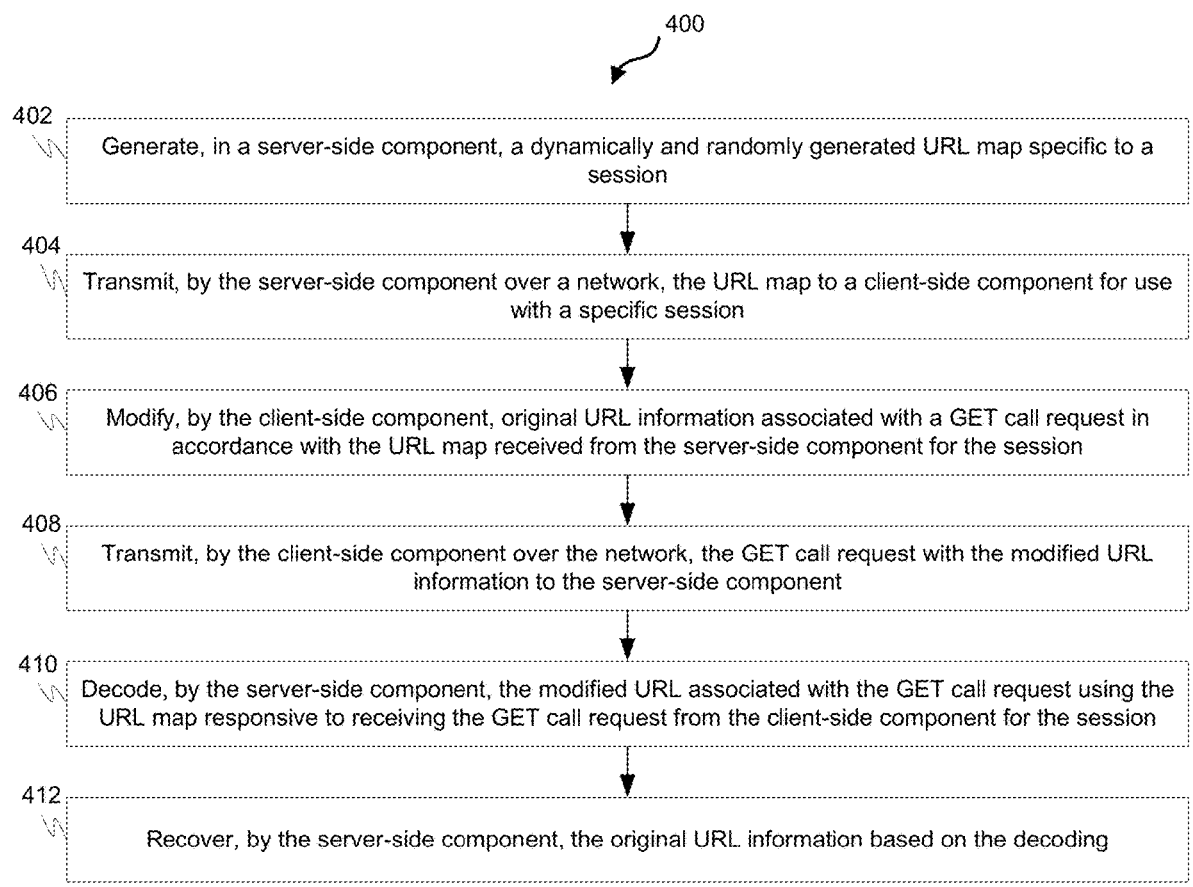
FIG. 4 is a process flow chart depicting an example process of executing a GET call request, in accordance with some embodiments.

FIG. 4 is a process flow chart depicting an example process of executing a GET call request. The order of operation within the example process 400 is not limited to the sequential execution as illustrated in the figure, but may be performed in one or more varying orders as applicable and in accordance with the present disclosure.

The example process 400 includes generating, in a server-side component, a dynamically and randomly generated URL map specific to a session (operation 402). The map identifies a plurality of randomly generated URL positions and for each URL position a randomly generated number of characters to skip. In various embodiments, generating a dynamically and randomly generated map specific to a session comprises: retrieving app owner input on endpoints to be protected and maximum GET URL length; and generating a dynamically and randomly generated map specific to a session based on the app owner input on endpoints to be protected and maximum GET URL length. The example process 400 further includes transmitting, by the server-side component over a network, the URL map to a client-side component for use with a specific session (operation 404).

The example process 400 includes modifying, by the client-side component, original URL information associated with a GET call request in accordance with the URL map received from the server-side component for the session (operation 406). In various embodiments, modifying original URL information comprises: generating for each URL position specified in the URL map a quantity of randomly generated characters equal to the number of characters to skip specified in the URL map for the URL position; building a dynamic and random URL by adding at each URL position specified in the map the quantity of randomly generated characters generated for the URL position; and prepending a main domain name to the dynamic and random URL. In various embodiments, modifying original URL information associated with a GET call request in accordance with the URL map received from the server-side component for the session comprises: storing the URL map in a local variable in session context; monitoring for a GET call; detecting a GET call; responsive to detecting a GET call, generating for each URL position specified in the URL map a quantity of randomly generated characters equal to the number of characters to skip specified in the URL map for the URL position; and building a dynamic and random URL by adding at each URL position specified in the URL map the quantity of randomly generated characters generated for the URL position. The example process 400 further includes transmitting, by the client-side component over the network, the GET call request with the modified URL information to the server-side component (operation 408).

The example process 400 includes decoding, by the server-side component, the modified URL associated with the GET call request using the URL map responsive to receiving the GET call request from the client-side component for the session (operation 410). In various embodiments, decoding the modified URL associated with the GET call request using the URL map comprises: extracting a URL after an endpoint of a main domain name; removing a number of characters specified in the URL map to be skipped at a first URL position specified in the map; and repeatedly removing a number of characters specified in the map to be skipped at a next URL position specified in the URL map until no more URL positions are left. The example process 400 further includes recovering, by the server-side component, the original URL information based on the decoding (operation 412).

In various embodiments, apparatus, systems, techniques, and articles described herein can provide systems and methods to protect REST GET call URLs in a Web App from information disclosure in URL loggers without using complex encryption methods. In various embodiments, apparatus, systems, techniques, and articles described herein can provide systems and methods of end to end total solution including server side and client side flows. In various embodiments, apparatus, systems, techniques, and articles described herein may be used to protect any GET URLs from information disclosure between client and server side traffic logging. In various embodiments, apparatus, systems, techniques, and articles described herein may provide a generic solution for any web app. In various embodiments, apparatus, systems, techniques, and articles described herein may work well irrespective of the web browser used by the end user.

Although the examples provided herein are directed to the use of REST, the apparatus, systems, techniques, and articles described herein may be applicable to other client-server architectures for protecting information transmission from client to server.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computing system comprising:
    a server-side component comprising non-transitory computer readable media encoded with programming instructions configurable to cause a processor in a server-side computing system to:
        generate a dynamically and randomly generated URL map specific to a session, the dynamically and randomly generated URL map identifying a plurality of randomly generated URL positions and for each URL position a randomly generated number; and
        transmit the dynamically and randomly generated URL map to a client-side computing system for use with a specific session; and
    a client-side component comprising non-transitory computer readable media encoded with programming instructions configurable to cause a processor in the client-side computing system to:
        receive the dynamically and randomly generated URL map for use with the specific session;
        modify a URL associated with a GET call request in accordance with the dynamically and randomly generated URL map; and
        transmit the GET call request with the modified URL to the server-side computing system;
    wherein the programming instructions in the server-side component are further configurable to cause the processor in the server-side computing system to decode the URL associated with the GET call request using the dynamically and randomly generated URL map.

2. The computing system of claim 1, wherein to generate the dynamically and randomly generated URL map specific to a session, the programming instructions cause the processor in the server-side computing system to:
    retrieve app owner input on endpoints to be protected and maximum GET URL length; and
    generate the dynamically and randomly generated URL map specific to a session based on the app owner input on endpoints to be protected and maximum GET URL length.

3. The computing system of claim 1, wherein to decode the URL associated with the GET call request using the dynamically and randomly generated URL map, the programming instructions cause the processor in the server-side computing system to:
  extract a URL after an endpoint of a main domain name;
  remove a number of characters corresponding to the randomly generated number specified in the dynamically and randomly generated URL map associated with a first URL position specified in the dynamically and randomly generated URL map; and
  repeatedly remove the number of characters corresponding to the randomly generated number specified in the dynamically and randomly generated URL map associated with a next URL position specified in the dynamically and randomly generated URL map until no more URL positions are left.

4. The computing system of claim 1, wherein to modify the URL associated with the GET call request in accordance with the dynamically and randomly generated URL map, the programming instructions cause the processor in the client-side computing system to:
  generate for each URL position specified in the dynamically and randomly generated URL map a quantity of randomly generated characters equal to the randomly generated number specified in the dynamically and randomly generated URL map for the URL position;
  build a dynamic and random URL by adding at each URL position specified in the dynamically and randomly generated URL map the quantity of randomly generated characters generated for the URL position; and
  prepend a main domain name to the dynamic and random URL.

5. The computing system of claim 1, wherein to modify the URL associated with the GET call request in accordance with the dynamically and randomly generated URL map, the programming instructions cause the processor in the client-side computing system to:
  store the dynamically and randomly generated URL map in a local variable in session context;
  monitor for a GET call;
  detect a GET call;
  responsive to detecting a GET call, generate for each URL position specified in the dynamically and randomly generated URL map a quantity of randomly generated characters equal to the randomly generated number specified in the dynamically and randomly generated URL map for the URL position; and
  build a dynamic and random URL by adding at each URL position specified in the dynamically and randomly generated URL map the quantity of randomly generated characters generated for the URL position.

6. The computing system of claim 1, wherein the server-side component is configured to cause the processor in the server-side computing system to implement a URL map server controller and a dynamic random URL server controller, and wherein:
  the URL map server controller is configured to build the dynamically and randomly generated URL map for a specific session and transmit the dynamically and randomly generated URL map to the client-side computing system; and
  the dynamic random URL server controller is configured to, responsive to being informed of a GET call URL with dynamic random characters added, get map information from the URL map server controller and restore original URL information.

7. The computing system of claim 1, wherein the client-side component is configured to cause the processor in the client-side computing system to implement a GET call detector, a URL map client controller, and a dynamic random URL client controller, and wherein:
  the GET call detector is configured to monitor calls for a GET call, detect a GET call, and inform the URL map client controller of the detected GET call;
  the URL map client controller is configured to store the dynamically and randomly generated URL map in a local variable in session context, generate for each URL position specified in the dynamically and randomly generated URL map a quantity of randomly generated characters equal to the randomly generated number specified in the dynamically and randomly generated URL map for the URL position, and inform the dynamic random URL client controller of the generated quantity of randomly generated characters; and
  the dynamic random URL client controller is configured to build a dynamic and random URL by adding at each URL position specified in the dynamically and randomly generated URL map the quantity of randomly generated characters generated for the URL position and transmit the GET call with the modified URL to server-side computing system.

8. A method of executing a GET call request, the method comprising:
  generating, in a server-side component, a dynamically and randomly generated URL map specific to a session, the dynamically and randomly generated URL map identifying a plurality of randomly generated URL positions and for each URL position a randomly generated number;
  transmitting, by the server-side component over a network, the dynamically and randomly generated URL map to a client-side component for use with a specific session;
  receiving, by the client-side component, the dynamically and randomly generated URL map for use with the specific session;
  modifying, by the client-side component, original URL information associated with a GET call request in accordance with the dynamically and randomly generated URL map;
  transmitting, by the client-side component over the network, the GET call request with the modified URL information to the server-side component;
  decoding, by the server-side component, the modified URL associated with the GET call request using the dynamically and randomly generated URL map using the dynamically and randomly generated URL map; and
  recovering, by the server-side component, the original URL information based on the decoding.

9. The method of claim 8, wherein generating the dynamically and randomly generated URL map specific to a session comprises:
  retrieving app owner input on endpoints to be protected and maximum GET URL length; and
  generating the dynamically and randomly generated URL map specific to a session based on the app owner input on endpoints to be protected and maximum GET URL length.

10. The method of claim 8, wherein decoding the modified URL associated with the GET call request using the dynamically and randomly generated URL map comprises:

extracting a URL after an endpoint of a main domain name;

removing a number of characters corresponding to the randomly generated number specified in the dynamically and randomly generated URL map associated with a first URL position specified in the dynamically and randomly generated URL map; and repeatedly removing the number of characters corresponding to the randomly generated number specified in the dynamically and randomly generated URL map associated with a next URL position specified in the dynamically and randomly generated URL map until no more URL positions are left.

11. The method of claim 8, wherein modifying the original URL information comprises:

generating for each URL position specified in the dynamically and randomly generated URL map a quantity of randomly generated characters equal to the randomly generated number specified in the dynamically and randomly generated URL map for the URL position;

building a dynamic and random URL by adding at each URL position specified in the dynamically and randomly generated URL map the quantity of randomly generated characters generated for the URL position; and prepending a main domain name to the dynamic and random URL.

12. The method of claim 8, wherein modifying the original URL information associated with the GET call request in accordance with the dynamically and randomly generated URL map received from the server-side component for the session comprises:

storing the dynamically and randomly generated URL map in a local variable in session context;

monitoring for a GET call;

detecting a GET call;

responsive to detecting a GET call, generating for each URL position specified in the dynamically and randomly generated URL map a quantity of randomly generated characters equal to the randomly generated number specified in the dynamically and randomly generated URL map for the URL position; and building a dynamic and random URL by adding at each URL position specified in the dynamically and randomly generated URL map the quantity of randomly generated characters generated for the URL position.

13. The method of claim 8, further comprising:

implementing, by the server-side component, a URL map server controller and a dynamic random URL server controller;

building the dynamically and randomly generated URL map for a specific session and transmitting the dynamically and randomly generated URL map to the client-side component, by the URL map server controller; and obtaining map information from the URL map server controller and restoring the original URL information, by the dynamic random URL server controller.

14. The method of claim 8, further comprising:

implementing, by the client-side component, a GET call detector, a URL map client controller, and a dynamic random URL client controller;

monitoring calls for a GET call, detecting a GET call, and informing the URL map client controller of the detected GET call, by the GET call detector;

storing the dynamically and randomly generated URL map in a local variable in session context, generating for each URL position specified in the dynamically and randomly generated URL map a quantity of randomly generated characters equal to a number specified in the dynamically and randomly generated URL map for the URL position, and informing the dynamic random URL client controller of the generated quantity of randomly generated characters, by the URL map client controller; and building a dynamic and random URL by adding at each URL position specified in the dynamically and randomly generated URL map the quantity of randomly generated characters generated for the URL position, and transmitting the GET call with the modified URL to server-side component, by the dynamic random URL client controller.

15. A computing system comprising:

a server-side component comprising non-transitory computer readable media encoded with programming instructions configurable to cause a processor in a server-side computing system to:

generate a dynamically and randomly generated URL map specific to a session, the dynamically and randomly generated URL map identifying a plurality of randomly generated URL positions and for each URL position a randomly generated number; and transmit the dynamically and randomly generated URL map to a client-side computing system for use with a specific session; and a client-side component comprising non-transitory computer readable media encoded with programming instructions configurable to cause a processor in the client-side computing system to:

receive the dynamically and randomly generated URL map for use with the specific session;

modify a URL associated with a Request for a data object in accordance with the dynamically and randomly generated URL map; and transmit the Request for the data object with the modified URL to the server-side computing system;

wherein the programming instructions in the server-side component are further configurable to cause the processor in the server-side computing system to decode the URL associated with the Request for the data object using the dynamically and randomly generated URL map.

16. The computing system of claim 15, wherein to generate the dynamically and randomly generated URL map specific to a session, the programming instructions cause the processor in the server-side computing system to:

retrieve app owner input on endpoints to be protected and maximum URL length; and generate the dynamically and randomly generated URL map specific to a session based on the app owner input on endpoints to be protected and the maximum URL length.

17. The computing system of claim 15, wherein to decode the URL associated with the Request for the data object using the dynamically and randomly generated URL map, the programming instructions cause the processor in the server-side computing system to:

extract a URL after an endpoint of a main domain name;

remove a number of characters corresponding to the randomly generated number specified in the dynamically and randomly generated URL map associated with a first URL position specified in the dynamically and randomly generated URL map; and repeatedly remove the number of characters corresponding to the randomly generated number specified in the dynamically and randomly generated URL map associated with a next URL position specified in the dynamically and randomly generated URL map until no more URL positions are left.

18. The computing system of claim 15, wherein to modify the URL associated with the Request for the data object in accordance with the dynamically and randomly generated URL map, the programming instructions cause the processor in the client-side computing system to:
generate for each URL position specified in the dynamically and randomly generated URL map a quantity of randomly generated characters equal to the randomly generated number specified in the dynamically and randomly generated URL map for the URL position;
build a dynamic and random URL by adding at each URL position specified in the dynamically and randomly generated URL map the quantity of randomly generated characters generated for the URL position; and
prepend a main domain name to the dynamic and random URL.

19. The computing system of claim 15, wherein to modify the URL associated with the Request for the data object in accordance with the dynamically and randomly generated URL map, the programming instructions cause the processor in the client-side computing system to:
store the dynamically and randomly generated URL map in a local variable in session context;
monitor for a GET call;
detect a GET call;
responsive to detecting a GET call, generate for each URL position specified in the dynamically and randomly generated URL map a quantity of randomly generated characters equal to the randomly generated number specified in the dynamically and randomly generated URL map for the URL position; and
build a dynamic and random URL by adding at each URL position specified in the dynamically and randomly generated URL map the quantity of randomly generated characters generated for the URL position.

20. The computing system of claim 15, wherein the server-side component is configured to cause the processor in the server-side computing system to implement a URL map server controller and a dynamic random URL server controller, and wherein:
the URL map server controller is configured to build the dynamically and randomly generated URL map for a specific session and transmit the dynamically and randomly generated URL map to the client-side computing system; and
the dynamic random URL server controller is configured to, responsive to being informed of a GET call URL with dynamic random characters added, get map information from the URL map server controller and restore original URL information.

\* \* \* \* \*